United States Patent
Dobyns

(10) Patent No.: US 10,103,786 B2
(45) Date of Patent: *Oct. 16, 2018

(54) SYSTEM AND METHOD FOR CLOSE PROXIMITY COMMUNICATION

(71) Applicant: FREELINC TECHNOLOGIES INC., Orem, UT (US)

(72) Inventor: Douglas Howard Dobyns, Lindon, UT (US)

(73) Assignee: Freelinc Technologies Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,377

(22) Filed: Aug. 1, 2017

(65) Prior Publication Data

US 2018/0034513 A1    Feb. 1, 2018

Related U.S. Application Data

(63) Continuation of application No. 15/246,287, filed on Aug. 24, 2016, now Pat. No. 9,722,674, which is a
(Continued)

(51) Int. Cl.
*H04B 5/00* (2006.01)
*H04B 7/06* (2006.01)

(52) U.S. Cl.
CPC ......... *H04B 5/0087* (2013.01); *H04B 5/0081* (2013.01); *H04B 7/0608* (2013.01)

(58) Field of Classification Search
CPC ... H04B 5/0087; H04B 5/0081; H04B 7/0608
(Continued)

(56) References Cited

U.S. PATENT DOCUMENTS 3,660,760 A    5/1972   Schaad et al.
4,363,137 A   12/1982   Salisbury
(Continued)

FOREIGN PATENT DOCUMENTS

GB              244965      8/2006
WO       WO 2007/039835    4/2007
WO       WO 2008/048376    4/2008

OTHER PUBLICATIONS

US 8,200,153, 06/2012, Takayama et al. (withdrawn)
(Continued)

*Primary Examiner* — Marceau Milord
(74) *Attorney, Agent, or Firm* — Thorpe North & Western

(57) ABSTRACT

A method for close proximity communication is disclosed. The method comprises detecting a signal transmitted by a close proximity communication (CPC) device at one of a distance of greater than or less than a CPC detection perimeter with a multi-mode magnetic induction communication (MMMIC) device with at least one antenna. The method further comprises identifying the type of device transmitting the detected signal. The method further comprises enabling the MMMIC device to communicate with the close proximity communication device at one of the distance of greater than the CPC detection perimeter and the distance of less than the CPC detection perimeter based on the type of device that is identified.

27 Claims, 2 Drawing Sheets

Related U.S. Application Data continuation of application No. 14/932,643, filed on Nov. 4, 2015, now Pat. No. 9,455,771, which is a continuation of application No. 14/523,702, filed on Oct. 24, 2014, now abandoned, which is a continuation of application No. 13/427,747, filed on Mar. 22, 2012, now Pat. No. 8,929,809.

(60) Provisional application No. 61/466,448, filed on Mar. 22, 2011.

(58) Field of Classification Search
USPC .............................. 455/41.1, 41.2, 411, 418
See application file for complete search history.

(56) References Cited

U.S. PATENT DOCUMENTS

| | | | |
|---|---|---|---|
| 4,908,869 A | 3/1990 | Lederman | |
| 5,187,720 A | 2/1993 | Shibata et al. | |
| 5,771,438 A | 6/1998 | Palermo et al. | |
| 5,841,122 A | 11/1998 | Kirchhoff | |
| 5,912,925 A | 6/1999 | Palermo et al. | |
| 5,966,641 A | 10/1999 | Flowerdew | |
| 5,982,764 A | 11/1999 | Palermo et al. | |
| 6,061,030 A | 5/2000 | Flowerdew | |
| 6,134,420 A | 10/2000 | Flowerdew et al. | |
| 6,208,740 B1 | 3/2001 | Greyer | |
| 6,230,029 B1 | 5/2001 | Hahn et al. | |
| 6,384,587 B2 | 5/2002 | Aizawa et al. | |
| 6,459,882 B1 | 10/2002 | Palermo et al. | |
| 6,636,728 B1 | 10/2003 | Avenel | |
| 6,665,804 B1 | 12/2003 | Minowa | |
| 6,700,544 B2 | 3/2004 | Anderson | |
| 6,792,246 B2 | 9/2004 | Takeda et al. | |
| 6,819,762 B2 | 11/2004 | Jones et al. | |
| 6,840,448 B2 | 1/2005 | Fukushima et al. | |
| 6,869,019 B1 | 3/2005 | Nagi et al. | |
| 7,035,608 B2 | 4/2006 | Palermo et al. | |
| 7,096,069 B2 | 8/2006 | Wanderstok et al. | |
| 7,142,811 B2 | 11/2006 | Terranova et al. | |
| 7,149,522 B2 | 12/2006 | Koskelainen | |
| 7,182,266 B2 | 2/2007 | Yoshinaga et al. | |
| 7,198,198 B2 | 4/2007 | Akiho et al. | |
| 7,215,924 B2 | 5/2007 | Palermo et al. | |
| 7,236,741 B2 | 6/2007 | Palermo et al. | |
| 7,254,366 B2 | 8/2007 | Palermo et al. | |
| 7,262,737 B2 | 8/2007 | Zarnowitz et al. | |
| RE39,982 E | 1/2008 | Palermo et al. | |
| RE40,018 E | 1/2008 | Palermo et al. | |
| 7,315,290 B2 | 1/2008 | Harada et al. | |
| 7,342,548 B2 | 3/2008 | Taniguchi et al. | |
| 7,346,061 B2 | 3/2008 | Takayama et al. | |
| 7,364,144 B2 | 4/2008 | Nordmeyer | |
| 7,438,235 B2 | 10/2008 | Miura et al. | |
| 7,457,637 B2 | 11/2008 | Deguchi et al. | |
| 7,532,901 B1 | 5/2009 | LaFranchise et al. | |
| 7,541,930 B2* | 6/2009 | Saarisalo | G06K 7/0008 |
| | | | 340/10.1 |
| 7,547,930 B2 | 6/2009 | Chu | |
| 7,565,187 B1 | 7/2009 | Dynok et al. | |
| 7,574,173 B2 | 8/2009 | Terranova et al. | |
| 7,627,289 B2 | 12/2009 | Huddart | |
| 7,647,024 B2 | 1/2010 | Wang et al. | |
| 7,712,663 B2 | 5/2010 | Sukegawa et al. | |
| 7,818,036 B2 | 10/2010 | Lair et al. | |
| 7,818,037 B2 | 10/2010 | Lair et al. | |
| 7,831,205 B2 | 11/2010 | Jack et al. | |
| 7,872,995 B2 | 1/2011 | Fujii et al. | |
| 7,893,888 B2 | 2/2011 | Rofougaran | |
| 7,903,041 B2 | 3/2011 | LeVan | |
| 7,933,554 B2 | 4/2011 | Hoyt et al. | |
| 7,941,096 B2 | 5/2011 | Perkins et al. | |
| 8,106,848 B2* | 1/2012 | Rofougaran | H01Q 9/145 |
| | | | 343/850 |
| 8,145,744 B2 | 3/2012 | Gieslis | |
| 8,190,086 B2 | 5/2012 | Sasaki et al. | |
| 8,194,557 B2 | 6/2012 | Sasai et al. | |
| 8,224,243 B2 | 7/2012 | Takayama et al. | |
| 8,233,841 B2 | 7/2012 | Griffin et al. | |
| 8,237,569 B2 | 8/2012 | Arai et al. | |
| 8,239,276 B2 | 8/2012 | Lin et al. | |
| 8,275,318 B2 | 9/2012 | Hoyt et al. | |
| 8,290,480 B2 | 10/2012 | Abramson | |
| 8,322,615 B2 | 12/2012 | Ikeda | |
| 8,335,470 B2* | 12/2012 | Koyama | H01Q 1/243 |
| | | | 235/492 |
| 8,340,577 B2* | 12/2012 | Griffin | H04B 5/0062 |
| | | | 340/568.1 |
| 8,358,596 B2 | 1/2013 | Byrne et al. | |
| 8,380,124 B2 | 2/2013 | Takei et al. | |
| 8,385,823 B2 | 2/2013 | Naniyat | |
| 8,401,596 B2 | 3/2013 | Takayama | |
| 8,410,775 B2 | 4/2013 | LaFranchise et al. | |
| 8,416,078 B2* | 4/2013 | Sayegh | G08B 13/248 |
| | | | 340/568.1 |
| 8,417,184 B2 | 4/2013 | Takayama et al. | |
| 8,422,947 B2 | 4/2013 | Konya | |
| 8,427,100 B2 | 4/2013 | Vorenkamp et al. | |
| 8,427,330 B2 | 4/2013 | Vorenkamp et al. | |
| 8,452,233 B2 | 5/2013 | Noel | |
| 8,457,547 B2 | 6/2013 | Meskens | |
| 8,457,550 B2 | 6/2013 | Goto et al. | |
| 8,466,740 B2 | 6/2013 | Kamata | |
| 8,494,198 B2 | 7/2013 | Aldaz et al. | |
| 8,532,568 B2 | 9/2013 | Kerselaers | |
| 8,532,570 B2 | 9/2013 | Fukami et al. | |
| 8,536,736 B2 | 9/2013 | Abramo et al. | |
| 8,583,040 B2 | 11/2013 | Baumert et al. | |
| 8,588,683 B2 | 11/2013 | Kamata | |
| 8,630,584 B2 | 1/2014 | Yu et al. | |
| 8,643,219 B2 | 2/2014 | Yabe et al. | |
| 8,665,840 B2 | 3/2014 | Hohl et al. | |
| 8,683,595 B1 | 3/2014 | Barker | |
| 8,706,029 B2 | 4/2014 | Washiro | |
| 8,746,568 B2 | 6/2014 | Edwards | |
| 8,811,897 B2* | 8/2014 | Matsumoto | G06K 19/0707 |
| | | | 455/41.1 |
| 8,838,022 B2 | 9/2014 | Dobyns | |
| 8,880,100 B2 | 11/2014 | Dobyns | |
| 8,902,772 B2 | 12/2014 | Lenaerts | |
| 8,903,416 B1 | 12/2014 | Perkins et al. | |
| 8,909,141 B2 | 12/2014 | Hansen et al. | |
| 8,929,809 B2* | 1/2015 | Dobyns | H04B 5/0081 |
| | | | 235/451 |
| 8,942,629 B2 | 1/2015 | Takayama et al. | |
| 8,954,005 B2 | 2/2015 | Zhao et al. | |
| 8,977,200 B2 | 3/2015 | Kitagawa et al. | |
| 8,983,529 B2 | 3/2015 | Akiyama et al. | |
| 8,983,615 B2 | 3/2015 | Tahmasian et al. | |
| 8,989,657 B2 | 3/2015 | McManus et al. | |
| 8,989,659 B2 | 3/2015 | Akita et al. | |
| 9,013,303 B2 | 4/2015 | Arai et al. | |
| 9,048,884 B2 | 6/2015 | LeVan | |
| 9,054,746 B2 | 6/2015 | Miyabayashi et al. | |
| 9,058,531 B2 | 6/2015 | Slutsky | |
| 9,071,288 B2 | 6/2015 | Yamaguchi | |
| 9,077,390 B1 | 7/2015 | Joehren | |
| 9,082,117 B2 | 7/2015 | Chin | |
| 9,106,273 B2 | 8/2015 | Takayama et al. | |
| 9,124,306 B2 | 9/2015 | Boyle et al. | |
| 9,124,992 B2 | 9/2015 | Jang | |
| 9,166,286 B2 | 10/2015 | Matsuoka et al. | |
| 9,166,655 B2 | 10/2015 | Meskens et al. | |
| 9,197,986 B1 | 11/2015 | Kerselaers et al. | |
| 9,219,529 B2 | 12/2015 | Akiyama et al. | |
| 9,229,666 B2 | 1/2016 | Oguma et al. | |
| 9,400,985 B2* | 7/2016 | Dobyns | G06Q 30/0234 |
| 9,455,771 B2* | 9/2016 | Dobyns | H04B 5/0081 |
| 9,722,674 B2* | 8/2017 | Dobyns | H04B 5/0081 |
| 2001/0006536 A1 | 7/2001 | Tajima | |
| 2002/0132585 A1 | 9/2002 | Palermo et al. | |
| 2002/0160722 A1 | 10/2002 | Terranova et al. | |
| 2002/0174025 A1 | 11/2002 | Hind et al. | |
| 2003/0050011 A1 | 3/2003 | Palermo et al. | |

(56) References Cited

U.S. PATENT DOCUMENTS

| | | |
|---|---|---|
| 2003/0161410 A1 | 8/2003 | Smith et al. |
| 2004/0178267 A1 | 9/2004 | Tsirline et al. |
| 2005/0064915 A1 | 3/2005 | Lair |
| 2005/0138077 A1 | 6/2005 | Michael et al. |
| 2005/0164636 A1 | 7/2005 | Palermo et al. |
| 2006/0073825 A1 | 4/2006 | Palermo et al. |
| 2006/0100926 A1 | 5/2006 | Abedi et al. |
| 2006/0119534 A1 | 6/2006 | Semba et al. |
| 2006/0206376 A1 | 9/2006 | Gibbs et al. |
| 2006/0224048 A1 | 10/2006 | Devaul et al. |
| 2007/0054616 A1 | 3/2007 | Culbert |
| 2007/0278290 A1 | 12/2007 | Messerges et al. |
| 2008/0090520 A1 | 4/2008 | Camp et al. |
| 2008/0091541 A1 | 4/2008 | Law et al. |
| 2008/0258863 A1 | 10/2008 | Vrielink et al. |
| 2008/0278289 A1 | 11/2008 | Gantner |
| 2009/0001930 A1 | 1/2009 | Pohjonen |
| 2009/0027166 A1 | 1/2009 | Stevens et al. |
| 2009/0029743 A9 | 1/2009 | Lair et al. |
| 2009/0296770 A1 | 1/2009 | Stevens et al. |
| 2009/0041241 A1 | 2/2009 | Dobyns et al. |
| 2009/0081943 A1 | 3/2009 | Dobyns et al. |
| 2009/0146796 A1 | 6/2009 | Goto et al. |
| 2009/0167699 A1 | 7/2009 | Rosenblatt et al. |
| 2009/0189816 A1 | 7/2009 | Nikitin et al. |
| 2009/0212941 A1 | 8/2009 | Vock et al. |
| 2009/0276439 A1 | 11/2009 | Rosesnblatt et al. |
| 2009/0276547 A1 | 11/2009 | Rosenblatt et al. |
| 2010/0026589 A1 | 2/2010 | Dou et al. |
| 2010/0079261 A1 | 4/2010 | Goto et al. |
| 2010/0080165 A1 | 4/2010 | Hossain et al. |
| 2010/0104031 A1 | 4/2010 | Lacour |
| 2011/0018768 A1 | 1/2011 | Thoen |
| 2011/0029370 A1 | 2/2011 | Roeding et al. |
| 2011/0183617 A1 | 7/2011 | Behzad et al. |
| 2011/0201270 A1 | 8/2011 | Perkins et al. |
| 2011/0220527 A1 | 9/2011 | Baatz |
| 2011/0307380 A1 | 12/2011 | Ido |
| 2012/0083228 A1 | 4/2012 | Baumert et al. |
| 2012/0116861 A1 | 5/2012 | Dobyns |
| 2012/0173351 A1 | 7/2012 | Hanson et al. |
| 2012/0203620 A1 | 8/2012 | Jensen |
| 2012/0220227 A1 | 8/2012 | Jensen |
| 2012/0281843 A1 | 11/2012 | Christensen et al. |
| 2012/0289153 A1 | 11/2012 | Dobyns |
| 2012/0296770 A1 | 11/2012 | Lin et al. |
| 2013/0020394 A1 | 1/2013 | Koujima et al. |
| 2013/0072115 A1 | 3/2013 | Jensen |
| 2013/0079037 A1 | 3/2013 | Dobyns |
| 2013/0114306 A1 | 5/2013 | Kooken et al. |
| 2013/0217334 A1 | 8/2013 | Yu et al. |
| 2013/0269945 A1 | 10/2013 | Mulholland et al. |
| 2013/0342326 A1 | 12/2013 | Wang et al. |
| 2014/0015649 A1 | 1/2014 | Akiyama et al. |
| 2014/0073237 A1 | 3/2014 | Meskens |
| 2014/0077937 A1 | 3/2014 | Kato et al. |
| 2014/0091758 A1 | 4/2014 | Hidaka et al. |
| 2014/0153768 A1 | 6/2014 | Hagen et al. |
| 2014/0162550 A1 | 6/2014 | Boyle et al. |
| 2014/0191968 A1 | 7/2014 | Hohl et al. |
| 2014/0213184 A1 | 7/2014 | Matsubara |
| 2014/0227974 A1 | 8/2014 | Perkins et al. |
| 2014/0263619 A1 | 9/2014 | Turocy et al. |
| 2014/0308896 A1 | 10/2014 | Baret et al. |
| 2014/0315485 A1 | 10/2014 | Marie |
| 2014/0348365 A1 | 11/2014 | Edwards |
| 2014/0376051 A1 | 12/2014 | Oguma et al. |
| 2015/0044968 A1 | 2/2015 | Dobyns |
| 2015/0045069 A1 | 2/2015 | Dobyns |
| 2015/0050883 A1 | 2/2015 | Dobyns |
| 2015/0054455 A1 | 2/2015 | Kim et al. |
| 2015/0079902 A1 | 3/2015 | Dhayni |
| 2015/0116090 A1 | 4/2015 | Proehl |
| 2015/0140927 A1 | 5/2015 | Chen et al. |
| 2015/0180270 A1 | 6/2015 | Takano |
| 2015/0229361 A1 | 8/2015 | Liu et al. |
| 2015/0244422 A1 | 8/2015 | Ohashi et al. |
| 2015/0254481 A1 | 9/2015 | Masuda et al. |
| 2015/0256230 A1 | 9/2015 | Yamaguchi |
| 2015/0256231 A1 | 9/2015 | Akiyama et al. |
| 2015/0318896 A1 | 11/2015 | Kerselaers et al. |
| 2015/0318932 A1 | 11/2015 | Kerselaers et al. |
| 2015/0319566 A1 | 11/2015 | Takayama et al. |
| 2015/0327003 A1 | 11/2015 | Dobyns |
| 2015/0365779 A1 | 12/2015 | Kerselaers et al. |
| 2015/0382150 A1 | 12/2015 | Ansermet et al. |
| 2016/0014582 A1 | 1/2016 | Dobyns |
| 2016/0029955 A1 | 2/2016 | Sato |
| 2016/0066143 A1 | 3/2016 | Dobyns et al. |

OTHER PUBLICATIONS

Agbinya et al.; Size and Characteristics of the 'Cone of Silence' in Near Field Magnetic Induction Communications; MILCIS2009, Canberra; Nov. 2009; 4 pages.

Finkenzeller; RFID Handbook: Fundamentals and Applications in Contactless Smart Cards and Identification; Chapter Three: Fundamental Operating Principles; Aug. 2010; pp. 29-59.

http://www.nfc-forum.org/home/; as accessed Sep. 17, 2010; 5 pages.

Identification Cards—Contactless Integrated Circuit(s) Cards—Proximity Cards—Part 1 : Physical Characteristics; ISO/IE JTC1/SC17/WG802/14/2007; 8 pages.

Near Field Communication Interface and Protocol (NFCIP-1); Standard ECMA-340; $2^{nd}$ Edition; Dec. 2004; 65 pages.

Radio-Frequency-Identification; http://rfid-handbook.com/; 4 pages.

Sandrock et al; Wireless Transmission of Speech and Data to, From, and Between Hearing Aids; The Hearing Journal; Nov. 2007; pp. 12-16; vol. 60, No. 11.

\* cited by examiner

SYSTEM AND METHOD FOR CLOSE PROXIMITY COMMUNICATION

CROSS-REFERENCE TO RELATED APPLICATION

This application is a continuation of U.S. patent application Ser. No. 15/246,287 filed Aug. 24, 2016, which is a continuation of U.S. patent application Ser. No. 14/932,643, filed Nov. 4, 2015, which is a continuation of U.S. patent application Ser. No. 14/523,702, filed Oct. 24, 2014, which is a continuation of U.S. patent application Ser. No. 13/427,747, filed Mar. 22, 2012, and which claims the benefit under 35 U.S.C. § 119(e) of a U.S. Provisional application filed on Mar. 22, 2011 in the U.S. Patent and Trademark Office and assigned Ser. No. 61/466,448, all of which are hereby incorporated by reference in their entirety.

BACKGROUND

A significant expansion in mobile computing devices and wireless communication has occurred in the early 21$^{st}$ century. The use of mobile computing devices is often an every day occurrence for many people. With the expansion has come a consolidation of electronic and every day devices. For instance, a typical smart phone now includes many functions that previously required the use of several separate products, such as a phone, a camera, a planner, a video player, a video game device, a planner and so forth.

The consolidation of functions in mobile computing devices is continuing. One function that is becoming widely adopted is the use of wireless communications from a mobile computing device to replace the use of credit cards. Rather than having to swipe a credit card to convey the necessary information to complete a financial transaction, a customer can use his or her smart phone to transmit credit card information or other financial information needed to complete the financial transaction.

One wireless technology that is facilitating the use of mobile computing devices to conduct financial transactions is the use of Near Field Communications (NFC). NFC is a simple extension of the International Organization for Standards (ISO) 14443 proximity card standard. Wireless devices using the standard can communicate with smart card readers within a 10 centimeter (four inch) radius. Thus, a smart phone that is NFC compliant can communicate with an electronic store transaction device to complete a transaction when the phone is placed within about four inches of the transaction device. By minimizing the radius in which communication can occur, the security of the transaction is significantly increased. However, the relatively small radius in which devices operating on the ISO 14443 standard can communicate significantly reduces the usefulness of the standard beyond close proximity communications.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
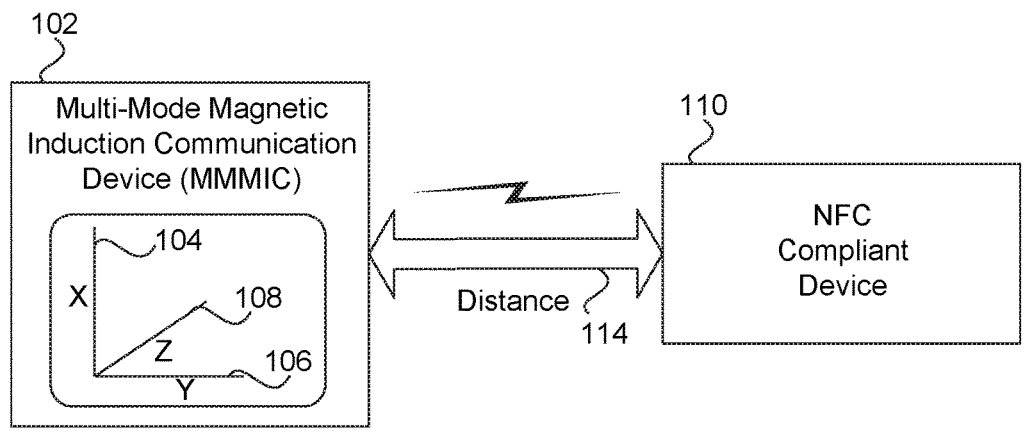
FIG. 1 illustrates a block diagram of an NFMI device in communication with an NFC compliant device at a selected distance in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defect( ) equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "mobile computing device" refers to a device including a digital processor coupled to a digital memory. The mobile computing device may be a simple device operable to receive a signal and respond. Alternatively, the mobile computing device can be a complex device having multiple processors and a display screen.

As used herein, the term "NFC compliant device" refers to a wireless communication device that is compliant with at least one of the ISO specifications including ISO 14443A, ISO 14443B, ISO 18092, and ISO 15693. At the time of writing, the most current ISO 14443 specification for parts A and B consists of four parts: (1) the ISO/IEC 14443-1: 2008 disclosing physical characteristics specifications; (2) the ISO/IEC 14443-2:2001 disclosing radio frequency and signal interference specifications; (3) the ISO/IEC 14443-3: 2001 disclosing initialization and anti-collision specifications; and (4) the ISO/IEC 14443-4:2001 disclosing transmission protocol specifications. The ISO 15693 specification consists of three parts: (1) ISO/IEC 15693-1: 2000 disclosing physical characteristics specifications; (2) ISO/IEC 15693-2:2006 disclosing air interface and initialization specifications; and (3) ISO/IEC 15693-3:2009 disclosing anti-collision and transmission protocol specifications. An NFC compliant device is considered to be compliant if the device is substantially compliant, or expected to be substantially compliant with an accepted version of the ISO 14443, ISO 18092, or ISO 15693 specifications, whether the accepted date is previous to the versions listed above or consists of a future accepted version of the specifications, or has evolved from similar technology over time. The term NFC compliant device can also refer to other types of close proximity communication devices that are not compliant with the ISO 14443 specifications but are configured to communicate over of a distance of less than about 10 cm. As used herein, the term "close proximity communication" or "CPC" refers to a close proximity communication transmitted and/or received by a close proximity communication device within a close proximity of another device configured to communicate with a CPC device, such as, for example, over a distance of less than about 100 cm, less than about 50 cm, less than about 30 cm, less than about 20 cm, less than about 10 cm, or less than about 5 cm.

As used herein, the term "close proximity communication device" or "CPC device" is intended to refer to NFC compliant devices, as well as other types of devices that are configured to communicate only within a close proximity, such as within a proximity of less than about 100 cm, less than about 50 cm, less than about 30 cm, less than about 20 cm, less than about 10 cm, or less than about 5 cm, for example.

The term "CPC detection perimeter" or "CPC perimeter" refers to a perimeter or boundary of a range of detection for a close proximity communication, such as a distance of less than about 100 cm, less than about 50 cm, less than about 30 cm, less than about 20 cm, less than about 10 cm, or less than about 5 cm. The CPC perimeter is not necessarily symmetrical. The CPC perimeter may be based on the physical parameters of a CPC device, such as antenna size, power output, receive sensitivity, and so forth. In a specific example, the CPC perimeter refers to a range in which a close proximity communication signal has a signal strength above a predetermined level as detected by an antenna of a CPC device. Alternatively, the CPC perimeter may refer to a selected distance over which a standard is defined to communicate. For example, the CPC detection perimeter of two NFC devices in communication is approximately 10 cm.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Near Field Communication (NFC) enables the exchange of data between devices over a CPC perimeter of about a 10 centimeters (around 4 inches) distance. The technology is a simple extension of the ISO/IEC 14443 proximity-card standard (proximity card, RFID) that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment.

As the acceptance and use of mobile computing devices increases, the functionality of these devices continues to expand. Applications for mobile computing devices may include access control. For example, using a Smartphone or other type of mobile computing device as a replacement for car keys, door keys, or login security to a computer or other devices that require access control. Currently Passive Keyless Entry (PKE) is a stand-alone functionality contained in a key fob, but may be integrated into a mobile computing device.

Another application is a proximity based exchange of information over a personal area network. A personal area network may comprise a distance of up to about 2 meters from the user. The ability to exchange data at distances greater than the NFC (up to about 10 cm) specification allows, and yet more localized than current Bluetooth (up to about 10m) specifications provide, is becoming increasingly more in demand as more and more people are carrying and utilizing mobile computing devices. Such exchange of information may be the transfer of data between a mobile computing device and a computer, or peer to peer, such as business card information exchange, product catalogs, URL address, product solicitation, marketing material, or social networking information such as personal profiles, calendars, social status, or proximity detection of other users within the same social network.

As wireless usage increases through an increase in wireless applications and an increase in the number of wireless users, there is a greater need for more localized, short-range wireless communication capabilities such as magnetic induction communication in order to minimize spectrum contention and ensure a good quality of service for each user. The need for more localized, short-range wireless communication capabilities is especially true in congested areas like shopping malls, stores, sporting events, conventions, restaurants, schools, the workplace, or other public gathering places.

A current challenge or difficulty to provide different applications that have multiple ranges of wireless communication is that each type of application described may require a unique or separate wireless communication system. The hardware required to meet the physical layer specifications of each system varies; and currently these systems are separate, discrete systems requiring separate antenna arrays, filters, low noise amplifiers (LNAs), power amplifiers (PAs), modulation and demodulation hardware, memory, and so forth. This complexity often requires additional electronic real estate inside of a device, thereby making it bulky and therefore impractical to employ all of the various short range magnetic induction capabilities in one device, such as a Smartphone or mobile computing device.

The relatively short communication range or CPC perimeter of approximately 10 centimeters (4 inches) for NFC compliant devices is convenient for security purposes since signals transmitted by the NFC device will typically not be received by other NFC compliant devices that are further than about 10 cm away. However, the relatively short range significantly reduces the usefulness of near field communications.

The signals transmitted by NFC compliant devices typically cannot be received by other NFC compliant devices outside of an approximately 10 cm radius due to inherent limitations placed in the ISO 1443 specification. For example, the specification provides for the use of only a single antenna. Signals that are transmitted using near field communications rely on magnetic induction. The magnetic induction signal is optimally received by an antenna that is parallel to the induction signal (i.e. parallel to the transmitting antenna). When the transmit antenna and the receive antenna are in an orthogonal plane relative to each other then the signal received has a minimum power. When two devices are relatively close, such as the 10 cm maximum range prescribed in the ISO 1443 specification, then the angular displacement between the two antennas is not as important. Particularly if the distance between the transmitter and receiver is small relative to the diameter of the transmitter antenna coil. However, as the distance between the transmitter and receiver increases, compared to the diameter of the transmitter coil, the angular displacement between the receiver and the transmitter antennas becomes increasingly important.

One technique for increasing the distance at which a device can receive a signal transmitted by a near field communication compliant device is through the use of multiple antennas that are mutually orthogonal to one another. The use of multiple orthogonal antennas to receive a magnetic induction modulated signal will be referred to as magnetic induction diversity. In one embodiment, the use of magnetic induction diversity can be used in combination with spatial diversity to allow the benefits of both spatial diversity and magnetic induction diversity to be accomplished.

Magnetic induction diversity can be the selection of the best aligned antenna to receive or transmit with another transceiver. Alternatively, magnetic induction diversity can involve summing the signal on two or more antennas. The use of magnetic induction diversity enables the variability of the proximity boundary to be substantially reduced. Since, in a system with multiple receiver antennas positioned in orthogonal planes, a receive antenna can always be selected that is significantly aligned (i.e., parallel) with a transmit antenna, it reduces the need to significantly increase the transmit power to ensure that the signal can be received at a selected distance independent of its relative orientation with the transmit antenna, and vice versa. It should be noted that the use of NFC transceivers does not, by itself, constitute magnetic induction diversity. The distance over which a magnetic induction device can communicate (i.e. a range) when using multiple orthogonal antennas to provide magnetic induction diversity can depend on a number of factors, including but not limited to a communication range of a transmitter and a receive sensitivity of a receiver. A number of additional factors can also contribute including the degree of orthogonality, the number of transmit and receive antennas, the shape and size of the antennas, the transmitter output power, the efficiency of the receiver, and so forth.

Through the use of magnetic induction diversity, wherein one or more antennas are selected from the multiple antennas based on their ability to receive or transmit a signal, the use of multiple antennas can significantly improve the ability to detect a signal transmitted by an NFC compliant device by ensuring optimal inductive coupling by maintaining the most efficient angular displacement between the transmit and receive antenna. In one embodiment, the signal detected by each of the orthogonal antennas can be summed to provide a maximum strength detected signal, thereby maximizing the distance over which the signal can be detected. Alternatively, a selection metric of the received signal can be measured at each antenna and one or more antennas can be selected for use in transmitting and/or receiving based on the selection metric. In addition, the transmitting signal can be sent over multiple antennas in an effort to target more energy to an NFC device's receive antenna(s).

For example, FIG. 1 provides an example illustration of a near field magnetic induction (NFMI) device 102 having three mutually orthogonal antennas 104, 106 and 108 that are located in the X, Y, and Z axes respectively. The NFMI device is separated from an NFC compliant device 110 by a distance 114. When the separation distance is greater than 10 centimeters (cm) then other NFC compliant devices typically cannot read the signal transmitted by the NFC compliant device.

In accordance with one embodiment of the present invention, magnetic induction diversity can be used to increase the distance 114 over which a signal can be received. The increase in distance can come without a significant increase in transmission power or electromagnetic emissions, which can cause mutual interference in other similar devices and or violate FCC limits and/or regulations. A signal transmitted by an NFC compliant device 110, or another type of magnetic induction communication device, can be detected through the use of at least two orthogonal antennas.

In one embodiment, the signal detected by each of the orthogonal antennas can be summed to provide a maximum strength detected signal. Alternatively, a selection metric of the received signal can be measured at each antenna. Some examples of selection metrics that may be used to select an antenna to receive the signal are listed below:
  receive Signal Strength Indicator (RSSI), wherein the antenna having the greatest RSSI is selected to receive the signal;
  decoder output bit error rate (BER), wherein the antenna with the received signal having the lowest BER at the decoder is selected to receive the signal;
  round-robin strategy (i.e. try each possible selection in turn and choose the best); and
  Shannon capacity, wherein the antenna providing a received signal with the highest Shannon capacity or highest instantaneous link capacity is selected.

Additional techniques can also be used as a selection metric, such as Eigen value selection of an antenna and selection based on the detection of cyclic redundancy codes used with forward error correction.

Moreover, the signals of multiple antennas can be selected and summed. Summing the receive signal on the multiple antennas enables a relatively low power signal, such as a signal transmitted by an NFC compliant device, to be received with a greater efficiency than is typically possible with a single antenna, thereby enabling the low power signal to be received at a greater distance than is possible with a device using a single antenna. Summing the receive signal can be accomplished in various ways. For example, in one embodiment, the receive signal on each antenna can be summed. In another embodiment, the best two antennas can be selected and summed based on the selection metrics. Any metric capable of prioritizing the antennas based on the received and/or transmitted signals between at least two magnetic induction communication devices is considered to be within the scope of the present invention.

In one embodiment, the near field magnetic induction device 102 can be configured to change modes based on a distance 114 from another near field communication device 110. A mode, as used herein, is a specific magnetic induction diversity scheme, a selected modulation scheme, a power output scheme, or some combination of these schemes based on desired operation and/or specification requirements. The use of a specific magnetic induction diversity scheme and modulation scheme can also affect the power output, the frequency of the signal, and the receive sensitivity, among other variables, as can be appreciated.

A device that is configured to change modes to communicate over a selected distance is referred to as a multi-mode magnetic induction communication (MMMIC) device. For instance, when the MMMIC device 102 is within a distance 114 of an NFC compliant device 110 then it can switch to an NFC compliant mode. When the MMMIC device is at a distance 114 of greater than about 10 cm (i.e., the CPC perimeter), then the MMMIC device 102 can switch to a mode incorporating the use of magnetic induction diversity to increase transmit power and receive signal sensitivity of the MMMIC device 102 with the NFC compliant device 110, thereby enabling communication at a distance 114 of greater than the CPC perimeter. The different modes may require different modulation schemes, power output levels, carrier frequency and so forth. This will be discussed more fully in the proceeding paragraphs.

There can be at least three different modes of communication for a MMMIC device: 1) a long range to long range mode (such as, for example, a MMMIC device communicating with an NFMI device); 2) a short range to short range mode (such as, for example, the MMMIC device in NFC mode communicating to an NFC device); and 3) a hybrid mode (such as, for example, where the MMMIC device can detect and communicate with an NFC device while outside the CPC perimeter. The MMMIC device can function as an extended range communication device (such as up to 2 meters or more, for example) and/or a short range NFC-type device or both.

At least two of the antennas 104-108 of the MMMIC device 102 with the desired selection metric, can be selected as the receive antenna to provide magnetic induction diversity. Antenna selection may be performed at a regular rate, such as several times per second. Antenna selection may be performed as often as every data packet that is received at the NFMI device 102. As each packet is received, the antenna(s) having the desired metric can be selected. Thus, as a mobile NFMI device is moved and rotated, the antenna(s) that are most closely parallel to the transmit antenna in the NFC compliant device, or with the greatest Signal-to-Noise Ratio (SNR), can be used to receive the signal transmitted from an NFC compliant device.

In one embodiment, the at least two antennas 104-108 in the MMMIC device 102 can both be used to transmit and receive with the antenna in the NFC compliant device 110. As communication between the devices occurs, the desired metric can be used to identify at least one of the antennas 104-108 in the MMMIC device that is most closely parallel with the antenna in the NFC compliant device 110. This allows the MMMIC device 102 to be moved and rotated with any type of angular displacement relative to the NFC compliant device 110 without significantly reducing the power of the received signal, thereby enabling the MMMIC device to communicate with the NFC compliant device at greater distances than a standard NFC compliant device having a single antenna would allow, while requiring no increase in the transmit power signal at the NFC compliant device.

In addition, the MMMIC device 102 may include features that further increase the ability of the MMMIC device to receive the relatively low power signal transmitted by the NFC compliant device. For example, one or more of the plurality of antennas 104-108 in the MMMIC device may be larger than the antenna design disclosed in the ISO 14443 specification. The ISO 14443 specification requires that a compliant antenna consist of a proximity integrated circuit card (PICC) antenna having dimensions of less than 81 milimeters (mm) by 49 mm.

The MMMIC device 102 can include larger antennas, or antennas having non planar shapes that are designed to have an increased gain relative to the PICC antenna disclosed in the ISO 14443 specification. The increased gain of the antenna(s) in the MMMIC device enables receive signals to be detected that have a lower power than can be received with an ISO 14443 compliant PICC antenna.

Antennas in the MMMIC device 102 can be selected based on the mode of the MMMIC device. For instance, if the MMMIC device is in an NFC compliant mode, a single antenna that is compliant with the ISO 14443 specification may be selected to transmit and receive with the NFC compliant device 110. Alternatively, if the MMMIC device is located a distance 114 of greater than 10 cm from the NFC compliant device, or automatically or actively changed to operate in a non-NFC compliant mode, then the MMMIC device may use magnetic induction diversity, wherein one or more antennas 104-108 that are not compliant with the ISO 14443 specification may be used to allow the MMMIC device to communicate (transmit and/or receive) with the NFC compliant device at a distance greater than the CPC perimeter of 10 cm.

Additional components comprising the radio frequency (RF) front end of the MMMIC device 102 may also be selected to be more sensitive than those used in an NFC compliant device 110. For example, a low noise amplifier (LNA) in the MMMIC device may have a lower noise figure than the LNA used in an NFC compliant device. In another example, a ferrite loaded core antenna or specialized materials selected in the antenna materials may be used to increase transmit and or receive efficiency of the MMMIC device.

In one embodiment, the NFMI device 102 can be a dual mode or a multi-mode device configured with the ability to change communication protocols to communicate with multiple inductively coupled communication devices having different communication protocols. For instance, the MMMIC device 102 can be configured to communicate with another MMMIC device using Gaussian minimum shift keying (GMSK), Quadrature Phase Shift Keying (QPSK), or another suitable modulation scheme at a carrier wave frequency of $F_1$.

NFC compliant devices are typically configured to use amplitude shift keying (ASK) modulation on a carrier wave frequency of $F_2$, which is typically 13.56 Megahertz (MHz). The frequency $F_1$ may be the same as, or different from $F_2$ depending on the type of application for which the NFMI device is applied.

Figure 2:
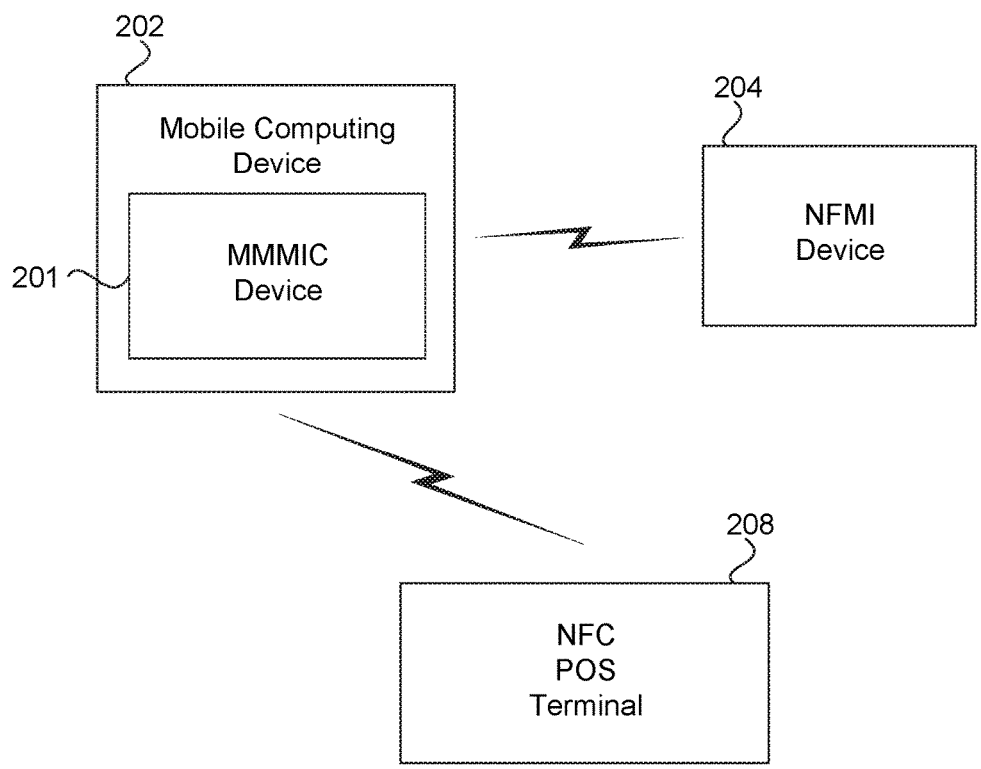
FIG. 2 illustrates a block diagram of a mobile computing device containing an NFMI device configured to communicate with an NFC compliant device at a selected distance and other NFMI devices in accordance with an alternative embodiment of the present invention.

For instance, in one embodiment the MMMIC device 102 may be incorporated in a cell phone, laptop, tablet computing device, handheld computing device, or other type of mobile computing device 202, as shown in FIG. 2. While the mobile computing device is described herein as being mobile, the mobile computing device may be a fixed device. The mobile computing device can be a handheld computing device, a portable multimedia device, a smart phone, a tablet computing device, a laptop computer, an embedded computing device or similar device. An embedded computing device is a computing device that is inlayed in a selected object such as a vehicle, a watch, a key fob, a ring, a key card, a token, a poker chip, a souvenir, a necklace amulet, and so forth. A computing device may be embedded in substantially any type of object. The mobile computing device can be a device that is user owned, rented, leased, associated with, or otherwise in the possession of the user. A user owned device can include mobile computing devices that are actually owned by relatives, friends, and employers of the user.

The MMMIC device 201 incorporated in the mobile computing device 202 can be used to communicate with other NFMI devices 204. For example, the NFMI devices may pass audio to and from a wireless headset configured to communicate using NFMI, exchange data to and from a computer, work as a passive keyless entry for an automobile or electronic security entrance lock, or may be configured to deliver advertisements at a commercial retail store such as a grocery store, department store, mall or other type of retail outlet. In addition, NFMI devices may be used to exchange information based on proximity with another person, such as social networking information or peer to peer data exchange information. A MMMIC device used to deliver advertisements is referred to herein as a MMMIC solicitation device. The MMMIC device 201 contained in the mobile computing device 202 can also be configured to communicate with NFC compliant devices, such as an NFC compliant point of sale (POS) terminal 208 or other type of NFC compliant device.

In one example description, a user can set up his or her mobile computing device 202 to receive desired advertisements such as discount information on selected products when visiting a retail outlet, such as a grocery store. A MMMIC device operating in the mobile computing device may receive the advertisements from an NFMI solicitation device or an NFC compliant device. As the user navigates through the retail outlet, when he or she passes an NFMI solicitation device, a signal can be sent identifying the product that is solicited. The MMMIC device operating in the mobile computing device can receive the signal and can notify the user through auditory, visual, or mechanical means activated in the mobile computing device, such as a chime, an image, or a vibration. If the product advertised by the NFMI solicitation device is a product that the user is interested in, as the user may have confirmed by configuring the mobile computing device to receive such information, then the user can be notified via his or her mobile computing device based on the information received by the MMMIC device 201 that is incorporated into the mobile computing device 202.

In one example, the NFMI device 204 may display an image or description of the product or service and provide a user interface (i.e. a keypad or touch screen) to allow the user to select or choose to select the advertised product/promotional information or coupon. Upon confirmation, the coupon may be transferred or transmitted to the user's mobile computing device without the need of the user to remove the device from his/her pocket or purse. This is very convenient and beneficial for the user and the advertiser.

It can be very ineffective to require a user with an NFC enabled device to hold the device within the required 10 cm radius of an NFC transmitter in the hope that this product actually has a coupon available. In addition, it is ineffective advertising as the user must make the effort, versus the product (transmit device) actively soliciting the user when the user is in proximity—such as walking down the aisle. The user may not have intended to stop at this product otherwise. When a longer range device, such as the MMMIC device 201 is used, then the transceiver in the NFMI device 204 can sense the presence of the MMMIC device 201, send its information, which can be received by the MMMIC device. The mobile computing device 202 can then filter the information received to see if such solicitation is welcome or allowed. Upon passing the appropriate filters, the mobile computing device 202 can alert the user via an audible sound or vibration, and communicate back to the NFMI device 204 to complete the exchange with the mobile computing device.

An NFMI device, such as the MMMIC device 201 is typically capable of receiving a signal that was transmitted within a distance of the receiver that is approximately equal to a wavelength of the carrier signal divided by 2pi ($\lambda/2\pi$). The region that is within this distance is typically referred to as the near field region. When the carrier signal frequency of the NFMI devices is 13.56 MHz, then the maximum effective distance for near field communication is approximately 3.4 meters. A more efficient distance to receive the near field signal may be within 2 meters (6 feet). Thus, when the user passes within 6 feet of a desired product, the user can be notified through his or her mobile computing device that the product is near. Additional information, such as a coupon, may be displayed on the user's mobile computing device to incentivize the user to purchase the product. The user can then locate the product on the shelf and determine whether or not to purchase the product.

The user's mobile computing device 202 containing the MMMIC device 201 can also be configured to detect the position of the NFMI solicitation device 204, thereby assisting the user to locate the desired product on the store shelves. The use of an NFMI device to detect the position of another NFMI device on store shelves is more fully disclosed in U.S. Pat. No. 7,532,901, which is herein incorporated by reference.

The user can continue through the store to purchase other desired products. When the user approaches the checkout stand, the user's mobile computing device 202 containing an MMMIC device 201 can be configured to detect an NFC compliant point of sale (POS) terminal 208 at the checkout stand. The NFC compliant POS terminal may be configured to transmit a signal at 13.85 MHz. As previously discussed, this signal is intended for other NFC compliant devices and is not typically detectable by NFC compliant devices at a distance of greater than CPC perimeter of 10 cm.

However, the MMMIC device 201 may be configured to detect the signal from the NFC compliant device at a distance up to and over one or two meters. When the user's mobile computing device 202 containing an NFMI device 201 detects a signal from an NFC compliant POS device 208, the mobile computing device can query the user to determine if the user wants to switch the MMMIC device to an NFC compliant mode. By switching the MMMIC device to an NFC compliant mode, the security level can be increased by reducing the size of the communication "bubble" in which a transmitted near field signal is detectable.

While the MMMIC device 201 can detect the low power signal transmitted by the NFC compliant POS device 208 at a distance greater than 10 cm, the opposite may not be true. The signal transmitted by the MMMIC device may have to be higher power than a typical NFC compliant transmitted signal in order for the NFC compliant POS device to receive the signal transmitted by the MMMIC device. Thus, security can be increased by switching the MMMIC device 201 in the mobile computing device 202 to be in an NFC compliant state for a selected transaction. In a specific example, the MMMIC device may change to NFC mode or an NFC compliant state. When the MMMIC device is in an NFC mode or an NFC compliant state, the MMMIC device may not be able to detect an NFC signal outside of an NFC range (i.e. CPC perimeter), such as at a distance greater than 10 cm from an NFC transmitting device. In one embodiment, the MMMIC device may be configured to be in an NFC mode or NFC compliant state when the MMMIC device is brought within the CPC perimeter. However, the MMMIC device can also be in an NFC mode or NFC compliant state outside of the CPC perimeter as well.

When the MMMIC device 201 is in an NFC compliant state then the MMMIC device can be configured to transmit and receive signals based on the ISO 14443 specification, thereby reducing the signal detection boundary for other NFC compliant devices to a radius of approximately 10 cm. The user can then transmit information, such as credit card information or other types of financial information that enables the retailer to obtain electronic funding for the user's purchase. The information may be information such as credit card information to conduct an electronic transaction using his or her mobile computing device.

Communication between the mobile computing device 202 and the NFC compliant POS Terminal 208 using the MMMIC device 204 can enable relatively secure transactions to be conducted in a more convenient manner. The data transfer rate of an NFC compliant device can be sufficiently slow that it may take several seconds or longer for an NFC compliant device to communicate selected information with the NFC compliant POS terminal. If a user moves his or her NFC compliant device further than 10 cm from the POS terminal while data is still transferring, it can disrupt the communication and may result in a failed financial or sales transaction. However, holding the device within the 10 cm range for several seconds may be difficult for a user.

In one embodiment of the present invention, the MMMIC device 201 can communicate with the NFC compliant POS terminal in an NFC compliant mode for a duration necessary to transmit secure information, such as a credit card number, a personal identification number, an encryption key, a checking or savings account number, or other personal information. Once the secure information has been transmitted, the MMMIC device 201 can be configured to switch to an extended mode in which the MMMIC device can communicate with the NFC compliant NFC terminal at a distance greater than 10 cm. Thus, a user may effectively "swipe" or "wave" his or her mobile computing device past the POS terminal, providing a sufficient length of time within the 10 cm range for the devices to communicate desired secure information. The user can then place the mobile computing device back in his or her pocket or purse, while information continues to be communicated between the devices. For instance, a sales receipt, an advertisement, a coupon, or other information may be communicated from the POS terminal to the MMMIC device so long as the user is within a selected distance, such as within approximately two meters of the POS terminal.

Thus, the MMMIC device can be used to provide a convenient means for a user to conduct relatively secure financial transactions and enable a relatively large amount of data to be communicated from the POS terminal without requiring the user to stay within 10 cm of the POS terminal throughout the transaction. While this example is provided with respect to communication between the MMMIC device and a POS terminal, the concept is not limited to a POS terminal. The MMMIC device can be configured to communicate secure communication via a low power mode, such as an NFC compliant mode, and then automatically switch to an extended mode to allow communication of non-secure data to occur over an extended range, such as within 2 meters of another NFC compliant or NFMI device.

In one embodiment, the MMMIC device 201 can communicate simultaneously in both NFC compliant mode and NFMI mode (i.e. non-NFC compliant mode). For instance, the MMMIC device 201 in the mobile computing device may communicate with an NFMI device 204 while also conducting NFC compliant communication with the NFC compliant POS Terminal 208.

When the MMMIC device 201 is placed in an NFC compliant mode, it must be determined which antenna 104-108 (FIG. 1) to use in the MMMIC device to conduct the NFC compliant communication. In one embodiment, a non-optimal antenna can be used, thereby freeing up the optimal antenna to conduct communication with another NFMI device, such as a headphone or ear piece.

For instance, the user may be using the MMMIC device 201 to transmit the voice signal of a phone call from the user's mobile computing device to an earpiece worn by the user (not shown) while the user is paying for items at a POS device. In one embodiment, the antenna with the best (most optimal) selection metric can always be used to transmit the voice communication to the ear piece. One of the remaining antennas in the MMMIC device can be used to transmit and receive signals to the NFC compliant POS terminal 208 when the MMMIC device 201 is placed in an NFC compliant mode to conduct the financial transaction with the POS terminal.

In one embodiment, the plurality of antennas in the MMMIC device can be ranked based on the selection metric measured for each antenna. Since the need to guarantee proper alignment and/or polarization between two NFC compliant devices is significantly reduced, due to the close proximity of the devices when communication occurs (typically less than 4 inches or 10 cm), then the antenna with the lowest rank in the NFMI link may be assigned to communicate with the NFC compliant device when the MMMIC device is placed in an NFC compliant mode with a selected NFC compliant device. Alternatively, any antenna other than the top ranked antenna (used for NFMI communication) may be used to communicate with the NFC complaint device.

In another embodiment, the user may determine that the additional privacy provided by the reduced circumference or link distance is not needed. In this case, the user may be able to conduct the transaction within a distance of about $\lambda/2\pi$ (3.5 meters at a frequency of 13.56 MHz) from the NFC compliant POS terminal 208, as previously discussed. In addition, the data transmitted and received by the MMMIC device 201 can be scrambled and/or encrypted, thereby making it difficult to intercept.

In one embodiment, the user may use his or her mobile computing device 202 to establish predetermined limits, such as financial limits, in which the NFMI enabled mobile computing device can be used to conduct a financial transaction at the greater distance (i.e. when it is not in NFC compliant mode).

For example, the user may determine that for purchases for products costing less than $20.00 then the financial transaction between the MMMIC enabled mobile computing device 202 and the NFC compliant POS terminal 208 can be conducted at a distance beyond the CPC perimeter of up to 3 meters from the terminal 208. The user will typically enter information, such as a pass code, at the POS terminal to complete the purchase. However, this may not be necessary in all situations. For inexpensive purchases, the user may simply pass within the determined distance of the NFC compliant POS terminal and receive a notification, such as a chime, that the purchase was completed. For instance, at a library the user can pass the checkout stand, hear a chime, and know that all of the books the user has selected are checked out to the user. The NFC compliant POS terminal can display information related to the purchase, rental, lease, or other type of transaction. For example, the POS terminal can display information such as what was purchased and the amount, and provide a receipt if desired.

In another example, the user may have previously established a customer or user account and the secure information is stored on the Service Provider's database. Such secure information will not be transmitted over the extended near field link. Only the customer account number or ID information (not credit card or financial info) is exchanged and therefore vulnerable.

This (potentially exposed or vulnerable) information would not be of worth as it is not usable at other locations or institutions—and can be more closely controlled. For instance, the information may be controlled through the use of a photo that may be displayed to a POS attendant. The transaction amount may have limitations. The account may have a maximum activity level, such as one transaction per day, and so forth.

When the NFMI device 201 is configured to operate at two separate frequencies, such as 13.92 MHz with other NFMI devices and 13.56 MHz or 13.85 MHz with NFC compliant devices, a separate RF front end may be used to detect and demodulate the NFMI signal and the NFC compliant signal. The NFMI device can be configured to route transmitted or received signals to the appropriate front end through detection, filtering, and switching. Each front end can include the appropriate matching filters, band pass filters, low noise amplifier, and down converter for the selected frequency. When the same operating frequency is used by both types of devices then the NFMI device may use a single front end to receive both NFC compliant signals and non-compliant signals from other NFMI devices. A different modulator or demodulator may be used depending on the type of modulation scheme used by each device.

Figure 3:
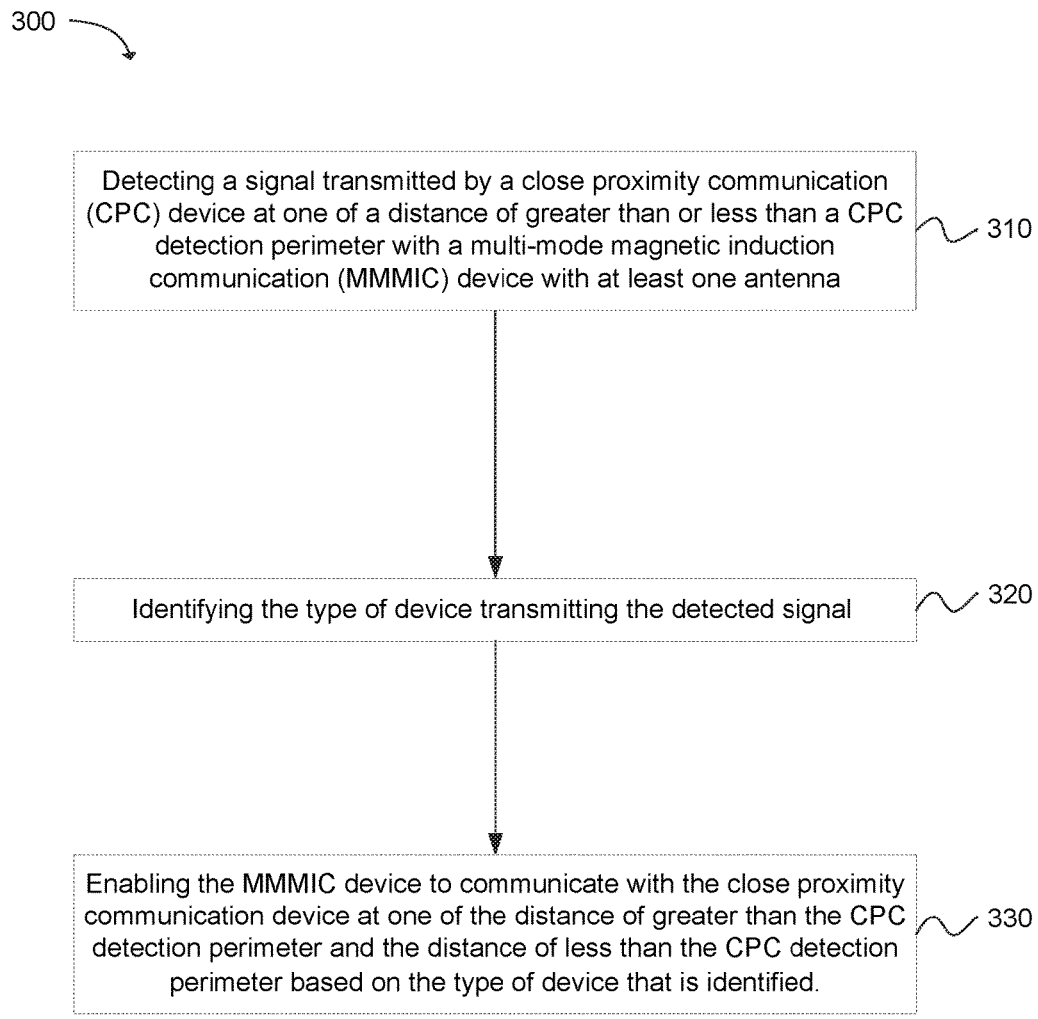
FIG. 3 depicts a flow chart of a method for close proximity communication in accordance with an embodiment of the present invention.

In another embodiment, FIG. 3 depicts a flow chart for a method 300 for close proximity communication. The method comprises detecting 310 a signal transmitted by a close proximity communication (CPC) device at one of a distance of greater than the CPC perimeter, or less than a CPC perimeter, with a multi-mode magnetic induction communication (MMMIC) device with at least one antenna. It should be noted that, while the MMMIC device can detect the signal outside of the CPC perimeter, the MMMIC device can also detect an NFC device within the CPC perimeter. The type of device transmitting the detected signal is identified 320. The MMMIC device is enabled 330 to communicate with the CPC device at one of the distance of greater than the CPC perimeter and a distance of less than the CPC perimeter based on the type of device that is identified. In one embodiment, a magnetic induction diversity scheme for the MMMIC device to communicate can be selected based on the distance over which the communication will occur with the identified device.

For instance, when it is determined that the type of NFC compliant device is a point of sale terminal, communication with the identified device may be limited to a distance of less than 10 cm. A magnetic induction diversity scheme can be selected, such as selecting the antenna with the lowest selected measured metric to transmit and receive with the NFC compliant device. When the identified device is an NFMI solicitation device then it may be determined to communicate at a distance of over 10 cm. A magnetic induction diversity scheme can be selected, such as using two antennas with the best metrics to receive the signal and summing the received signals together to maximize the distance over which the communication can occur.

While a CPC perimeter distance of 10 cm is used in the example, the actual distance of the perimeter is device dependent. Different types of close proximity communication devices can have different CPC perimeter sizes, as previously discussed. For instance, the CPC perimeter may be 5 cm, 10 cm, 20 cm, 50 cm, or even 100 cm or more.

In another embodiment, a reconfigurable magnetic induction communication system is disclosed. The system comprises a transceiver configured to transmit and receive an NFMI signal. A configuration module is in communication with the transceiver. The configuration module can provide instructions to a modulation module configured to select one of a plurality of modulation types. The selected modulation type can be used to modulate and/or demodulate a transmitted or received NFMI signal. The configuration module can also provide instructions to a diversity module configured to select at least one of a plurality of substantially orthogonal antennas coupled to the transceiver to transmit and receive the NFMI signal.

In one embodiment, the modulation module can communicate with a reconfigurable modulation chip. For instance, a Field Programmable Gate Array (FPGA) chip may be reprogrammed to provide different types of modulation and demodulation, such as phase-shift keying, frequency-shift keying, amplitude-shift keying, quadrature amplitude modulation, minimum-shift keying, Gaussian minimum-shift keying, orthogonal frequency-division multiplexing, or another desired type of modulation or demodulation. Alternatively, the modulation module can be used to switch the transceiver between different types of modulation chips or circuit boards. For instance, one chip can be configured to perform amplitude-shift keying and another chip can be configured to perform Gaussian minimum-shift keying. The modulation module can switch a connection with the transceiver to the correct chip to conduct the desired type of modulation. The type of modulation can be selected to communicate with another magnetic induction communication system using a selected type of modulation.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a multi-mode magnetic induction communication (MMMIC) device, the MMMIC device configured to:
    detect a signal transmitted by a close proximity communication (CPC) device at one of a distance of greater than or less than a CPC detection perimeter;
    identify the type of device transmitting the detected signal; and
    communicate with the CPC device at one of the distance of greater than the CPC detection perimeter and the distance of less than the CPC detection perimeter based on the type of device that is identified;
    detect the signal using magnetic induction diversity selected from at least two orthogonal antennas at the MMIC device; and
    select a magnetic induction diversity scheme for the MMMIC device to communicate based on the distance selected over which to communicate with the identified device.

2. The apparatus of claim 1, wherein the MMMIC device is further configured to detect a signal transmitted by a device compliant with a standard selected from the group consisting of an ISO 14443A standard and an ISO 14443B standard.

3. The apparatus of claim 1, wherein the MMMIC device is further configured to communicate with the CPC device at one of the distance of greater than the CPC detection perimeter and the distance of less than the CPC detection perimeter based on an amount of a financial transaction to be completed between the MMMIC device and the CPC device.

4. The apparatus of claim 3, wherein the MMMIC device is further configured to set the amount of the financial transaction at which the MMMIC device can communicate with the CPC device at the distance of greater than the CPC detection perimeter.

5. The apparatus of claim 1, wherein the MMMIC device is further configured to communicate with the CPC device at one of the distance of greater than the CPC detection perimeter and the distance of less than the CPC detection perimeter based on a desired security level for information communicated between the MMMIC device and the CPC device.

6. The apparatus of claim 5, wherein the MMMIC device is further configured to query a user for credential information when the desired security level is greater than a predetermined level and the distance is greater than the CPC detection perimeter.

7. The apparatus of claim 1, wherein the MMMIC device is further configured to communicate with the CPC device at the distance of less than the CPC detection perimeter when the CPC device is identified as a point of sale terminal.

8. The apparatus of claim 1, wherein the MMMIC device is further configured to communicate with the CPC device at the distance of greater than the CPC detection perimeter when the CPC device is identified as an advertising terminal.

9. The apparatus of claim 1, wherein the MMMIC device is further configured to communicate with the CPC device at the distance of greater than the CPC detection perimeter when the close proximity communication device is identified as not being a point of sale terminal.

10. The apparatus of claim 1, wherein the MMMIC device is further configured to be in compliance with the NFC specification when the MMMIC device is communicating with the close proximity communication device at the distance of less than the CPC detection perimeter.

11. The apparatus of claim 1, wherein the MMMIC device is further configured to be in compliance with the NFC specification while selected secure information is communicated, and then enabling the MMMIC device to communicate at the distance of greater than the CPC detection perimeter to communicate selected non-secure information to one of an NFC compliant device and a non-NFC compliant device.

12. The apparatus of claim 1, wherein the MMMIC device is further configured to select one of the at least two antennas to communicate with the CPC device at the distance of less than the CPC detection perimeter, wherein the antenna selected is a most inefficient antenna of the at least two antennas.

13. The apparatus of claim 1, wherein the MMMIC device is further configured to select one of the at least two antennas to communicate with the close proximity communication device at the distance of less than the CPC detection perimeter, wherein the antenna selected is not a most efficient antenna of the at least two antennas.

14. The apparatus of claim 1, wherein the MMMIC device is further configured to communicate with the CPC device based on the type of device that is identified at the distance of greater than the CPC detection perimeter and at a distance that is less than a near field region.

15. The apparatus of claim 1, wherein the MMMIC device is further configured to select a magnetic induction diversity scheme further comprising selecting a single antenna when communicating at the distance of less than the CPC detection perimeter.

16. The apparatus of claim 1, wherein the MMMIC device is further configured to select a magnetic induction diversity scheme further comprising selecting one of the at least two antennas to communicate with the CPC device at the distance of less than the CPC detection perimeter while simultaneously communicating with an additional near field magnetic inductive (NFMI) communication device using at least one other of the at least two antennas.

17. The apparatus of claim 1, wherein the CPC detection perimeter is one of about 10 cm, 20 cm, or 50 cm.

18. An apparatus of a close proximity communication (CPC) device, the CPC device configured to:
transmit a signal at one of a distance of greater than or less than a CPC detection perimeter; and
enable a MMMIC device to communicate with the CPC device at one of the distance of greater than the CPC detection perimeter and the distance of less than the CPC detection perimeter based on the type of CPC device;
enable a MMMIC device to detect the signal using magnetic induction diversity selected from at least two orthogonal antennas at the MMIC device; and
enable a MMMIC device to select a magnetic induction diversity scheme for the MMMIC device to communicate based on the distance selected over which to communicate with the identified device.

19. The apparatus of claim 18, wherein the CPC device is further configured to communicate with the MMMIC device at one of the distance of greater than the CPC detection perimeter and the distance of less than the CPC detection perimeter based on an amount of a financial transaction to be completed between the MMMIC device and the CPC device.

20. The apparatus of claim 18, wherein the CPC device is further configured to communicate with the MMMIC device at one of the distance of greater than the CPC detection perimeter and the distance of less than the CPC detection perimeter based on a desired security level for information communicated between the MMMIC device and the CPC device.

21. The apparatus of claim 18, wherein the CPC device is further configured to communicate with the MMMIC device at the distance of less than the CPC detection perimeter when the CPC device is identified as a point of sale terminal.

22. The apparatus of claim 18, wherein the CPC device is further configured to communicate with the MMMIC device at the distance of greater than the CPC detection perimeter when the CPC device is identified as an advertising terminal.

23. The apparatus of claim 18, wherein the CPC device is further configured to communicate with the MMMIC device at the distance of greater than the CPC detection perimeter when the close proximity communication device is identified as not being a point of sale terminal.

24. The apparatus of claim 18, wherein the CPC device is further configured to communicate with the MMMIC device based on the type of device that is identified at the distance of greater than the CPC detection perimeter and at a distance that is less than a near field region.

25. At least one non-transitory machine readable storage medium having instructions embodied thereon for performing close proximity communication, the instructions when executed by a MMMIC device perform the following:
detect a signal transmitted by a close proximity communication (CPC) device at one of a distance of greater than or less than a CPC detection perimeter;
identify the type of device transmitting the detected signal; and
enable the MMMIC device to communicate with the CPC device at one of the distance of greater than the CPC detection perimeter and the distance of less than the CPC detection perimeter based on the type of device that is identified;
detect the signal using magnetic induction diversity selected from at least two orthogonal antennas at the MMIC device; and
select a magnetic induction diversity scheme for the MMMIC device to communicate based on the distance selected over which to communicate with the identified device.

26. The at least non-transitory one machine readable storage medium of claim 25, wherein the instructions when executed by a MMMIC device also perform the following:
communicate with the CPC device at one of the distance of greater than the CPC detection perimeter and the distance of less than the CPC detection perimeter based on an amount of a financial transaction to be completed between the MMMIC device and the CPC device.

27. The at least one non-transitory machine readable storage medium of claim 25, wherein the instructions when executed by a MMMIC device also perform the following:
communicate with the CPC device at one of the distance of greater than the CPC detection perimeter and the distance of less than the CPC detection perimeter based on a desired security level for information communicated between the MMMIC device and the CPC device.

* * * * *